US009641566B1

(12) United States Patent
Hiremath

(10) Patent No.: US 9,641,566 B1
(45) Date of Patent: May 2, 2017

(54) METHODS AND SYSTEMS FOR INSTANTANEOUS ASYNCHRONOUS MEDIA SHARING

(71) Applicant: Opentest, Inc., San Francisco, CA (US)

(72) Inventor: Vinay Siddharam Hiremath, San Francisco, CA (US)

(73) Assignee: Opentest, Inc., San Francisco, CA (US)

( * ) Notice: Subject to any disclaimer, the term of this patent is extended or adjusted under 35 U.S.C. 154(b) by 0 days.

(21) Appl. No.: 15/364,568

(22) Filed: Nov. 30, 2016

Related U.S. Application Data

(60) Provisional application No. 62/397,306, filed on Sep. 20, 2016.

(51) Int. Cl.
| | |
|---|---|
| *H04N 7/173* | (2011.01) |
| *H04L 29/06* | (2006.01) |
| *H04N 21/433* | (2011.01) |
| *H04N 19/40* | (2014.01) |
| *H04N 21/232* | (2011.01) |

(Continued)

(52) U.S. Cl.
CPC .......... *H04L 65/4007* (2013.01); *H04L 47/25* (2013.01); *H04N 19/40* (2014.11); *H04N 21/232* (2013.01); *H04N 21/234* (2013.01); *H04N 21/4334* (2013.01)

(58) Field of Classification Search
CPC ........................... H04N 21/232; H04N 21/234
USPC .................................................. 725/74–104
See application file for complete search history.

(56) References Cited

U.S. PATENT DOCUMENTS

| | | |
|---|---|---|
| 5,558,339 A | 9/1996 | Perlman |
| 6,674,459 B2 | 1/2004 | Ben-Shachar et al. |
| 6,686,970 B1 | 2/2004 | Windle |

(Continued)

FOREIGN PATENT DOCUMENTS

WO 0110128 A1 2/2001

OTHER PUBLICATIONS

Minneman, S. L., et al., "Where Were We: Making the using near-synchronous, pre-narrative video," Multimedia '93 Proceedings of the first ACM international conference on Multimedia, Aug. 2-6, 1993, pp. 207-214, Anaheim, CA, U.S.
Sripanidkulchai, K., et al., "An Analysis of Live Streaming Workloads on the Internet," IMC '04 Proceedings of the 4th ACM SIGCOMM conference on Internet measurement, Oct. 25-27, 2004, pp. 41-54, Taormina, Italy.

(Continued)

*Primary Examiner* — Mushfikh Alam
(74) *Attorney, Agent, or Firm* — American Patent Agency PC; Daniar Hussain; Xiaomeng Shi

(57) ABSTRACT

Disclosed are methods and systems for instantaneous asynchronous media sharing. The method comprises establishing a communication channel between a user device and a server; receiving a media stream object containing a recording of a screen of the user device through the communication channel, as it is recorded; storing the recording to permanent storage as it is received; receiving a publication request at a publication request time; and in response to receiving the publication request, making the recording accessible to one or more viewers within an immediate time frame by generating a complete video file ready for download, wherein the immediate time frame is a time to upload a remaining number of bytes to the server from the publication request time plus a time to complete processing the remaining number of bytes to generate the complete video file. Also disclosed are benefits of the new methods, and alternative embodiments of implementation.

20 Claims, 12 Drawing Sheets

(51) Int. Cl.
*H04N 21/234* (2011.01)
*H04L 12/825* (2013.01)

(56) References Cited

U.S. PATENT DOCUMENTS

| | | | |
|---|---|---|---|
| 6,882,793 B1 | 4/2005 | Fu et al. | |
| 7,797,380 B2* | 9/2010 | Morioka | H04N 9/8233 |
| | | | 709/203 |
| 7,987,492 B2 | 7/2011 | Liwerant et al. | |
| 8,116,235 B2 | 2/2012 | Hu et al. | |
| 8,156,176 B2 | 4/2012 | Lerman et al. | |
| 8,187,104 B2 | 5/2012 | Pearce | |
| 8,204,955 B2 | 6/2012 | McBride et al. | |
| 8,528,028 B2 | 9/2013 | Sheth et al. | |
| 8,661,496 B2 | 2/2014 | Perlman et al. | |
| 8,839,336 B2 | 9/2014 | Perlman et al. | |
| 8,893,207 B2 | 11/2014 | Perlman et al. | |
| 8,929,441 B2 | 1/2015 | Ma et al. | |
| 9,003,461 B2 | 4/2015 | Perlman et al. | |
| 9,167,275 B1* | 10/2015 | Daily | H04N 21/812 |
| 9,214,191 B2 | 12/2015 | Guzik | |
| 9,332,315 B2* | 5/2016 | Agrawal | H04N 21/4756 |
| 2005/0246752 A1 | 11/2005 | Liwerant et al. | |
| 2005/0281470 A1 | 12/2005 | Adams | |
| 2008/0120546 A1 | 5/2008 | Pulier | |
| 2009/0164902 A1 | 6/2009 | Cohen et al. | |
| 2010/0083303 A1* | 4/2010 | Redei | H04N 7/17318 |
| | | | 725/32 |
| 2011/0052155 A1 | 3/2011 | Desmarais et al. | |
| 2011/0277009 A1* | 11/2011 | Damola | H04N 7/165 |
| | | | 725/116 |
| 2012/0066722 A1 | 3/2012 | Cheung et al. | |
| 2014/0317659 A1* | 10/2014 | Yasutake | H04N 21/42209 |
| | | | 725/43 |
| 2014/0368337 A1* | 12/2014 | Venkatachari | G08B 27/008 |
| | | | 340/539.13 |
| 2015/0156543 A1* | 6/2015 | Allegretti | H04N 21/44218 |
| | | | 725/12 |
| 2015/0249845 A1* | 9/2015 | Tirosh | H04H 60/05 |
| | | | 725/62 |
| 2016/0080807 A1* | 3/2016 | Trimper | H04N 21/458 |
| | | | 725/30 |
| 2016/0192029 A1* | 6/2016 | Bergstrom | H04L 43/0882 |
| | | | 725/109 |
| 2016/0205431 A1* | 7/2016 | Avedissian | G06F 3/0481 |
| | | | 725/37 |

OTHER PUBLICATIONS

Meyn, A. J. R., "Browser to Browser Media Streaming with HTML5", Aalto University website, available at https://aaltodoc.aalto.fi/bitstream/handle/123456789/6094/master_meyn_antony_j_r_2012.pdf, accessed on Nov. 29, 2016.
Cheng, X., et al, "NetTube: Exploring Social Networks for Peer-to-Peer Short Video Sharing", IEEE INFOCOM 2009 proceedings, pp. 1152-1160, Rio de Janeiro, Brazil.
Autodesk, "Socialcam 2.6.1 for Android—Download", available at http://socialcam.en.uptodown.com/android, accessed on Nov. 29, 2016.
Wikipedia, "Socialcam—Wikipedia", available at https://en.wikipedia.org/wiki/Socialcam, accessed on Nov. 4, 2016.
Chavanu, B., "How to Use and Get Active Socialcam 4.0 [iPhone & Android]", available at http://www.makeuseof.com/tag/active-socialcam-40-iphone-androidi, accessed on Nov. 4, 2016.
Mobilemadly, "Share Videos With Friends While Recording Using SocialCam", available at http://www.mobilemadly.com/2012/03/share-videos-with-friends-while-recording-using-socialcam.html, accessed on Nov. 29, 2016.
Blue Jeans Network, Inc., "BlueJeabs Video Sharing FAQ's", available at https://www.bluejeans.com/sites/default/files/uploaded_images/Blue-Jeans-Video-Sharing-FAQ.pdf, accessed on Nov. 4, 2016.
Rousseau, "How to upload video to cloud storage immediately while recording", available at http://www.idganswers.com/question/12023/how-to-upload-video-to-cloud-storage-immediately-while-recording, accessed on Nov. 29, 2016.
HYFY.IO, "Features—HYFY Screen Recorder", available at https://www.hyfy.io/features/, accessed on Nov. 29, 2016.
Screencast-O-Matic, "Screencast-O-Matic Homepage", available at http://screencast-o-matic.com/home, accessed on Nov. 29, 2016.
Tokbox Inc., "About us—Tokbox", available at https://tokbox.com/about, accessed on Nov. 29, 2016.
Williams, M., "Screen recorders for Chrome: Viewedlt vs Openvid", available at http://betanews.com/2016/10/28/screen-recorders-for-chrome-viewedit-vs-openvid/, accessed on Nov. 29, 2016.
Cisco, "Get the WebEx Player—Watch, share, and edit WebEx recordings", available at https://www.webex.com/play-webex-recording.html, accessed on Nov. 29, 2016.
Baccichet, P., "Video Processing at Dropbox", available at https://blogs.dropbox.com/tech/2014/02/video-processing-at-dropbox/, accessed on Nov. 29, 2016.

\* cited by examiner

METHODS AND SYSTEMS FOR INSTANTANEOUS ASYNCHRONOUS MEDIA SHARING

REFERENCE TO RELATED APPLICATIONS

This application is a non-provisional of and claims the benefit of provisional application having U.S. Ser. No. 62/397,306, filed on 20 Sep. 2016, and entitled "Methods and Systems for Instantaneous Asynchronous Media Sharing," the entire disclosure of which is hereby incorporated by reference in its entirety herein.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the U.S. Patent and Trademark Office files or records, but otherwise reserves all copyright and trade dress rights whatsoever.

FIELD OF THE INVENTION

Embodiments of the present invention are related to methods and systems for instantaneous asynchronous media sharing.

BACKGROUND OF THE INVENTION

Video communication is a very efficient way of knowledge sharing and information exchange in various fields including education, business and marketing. However, with existing technologies, streamable media such as audio and video are generally associated with non-trivial waiting times while the media get uploaded, processed, and stored, before being made shareable on network-connected devices. For example, uploads to the popular video-sharing website YouTube involve a long waiting time due to the transcoding of quality streams before allowing users to view and share the media. Another video-sharing website, Vimeo, has a similar process as YouTube, with waiting times taking up to 40 minutes. In the case of Vimeo and YouTube, waiting is still acceptable because media are consumed in a televised format instead of being used as a messaging mechanism.

File hosting service provider Dropbox attempts to reduce this waiting time by utilizing on-demand transcoding in real-time while streaming. Transcoding happens after an upload completes, with the operation first done on the initial few seconds of a video to give servers sufficient time to catch up and transcode the rest of the video content on-demand or as a background job. In other words, processing is deferred to make the transmission seem streamed by doing some work up-front. As a result, a user will inevitably run into buffering issues.

The aforementioned difficulties of synchronous real-time video communication and waiting times associated with asynchronous media upload provide for unsatisfactory user experiences and technical difficulties with using video as part of business communications.

It is against this background that the present invention was developed.

BRIEF SUMMARY OF THE INVENTION

The inventor of the present invention has created methods and systems for instantaneous asynchronous media sharing; that is, making recorded media instantaneously ready for consumption once the media is finished being created. Several alternative methods of implementation are described below.

More specifically, in one aspect, one embodiment of the present invention is a system for instantaneous and asynchronous media sharing. The system includes a server having access to at least one processor and a user device, and a non-transitory physical medium for storing program code and accessible by the server. The program code when executed by the processor causes the processor to establish a communication channel between the user device and the server; receive, through the communication channel from the user device, a media stream object containing a recording initiated on the user device, where the recording is uploaded from the user device as it is recorded on the user device, and where the recording is of a screen of the user device. The program code when executed by the processor also causes the processor to store the recording to permanent storage as the recording is received; receive a publication request from the user device, where the publication request is received from or input by a user at a publication request time; and in response to receiving the publication request, make the recording accessible to one or more viewers within an immediate time frame by generating, from the recording, a complete video file ready for download by the one or more viewers, wherein the immediate time frame is a time to upload a remaining number of bytes to the server from the publication request time plus a time to complete processing the remaining number of bytes to generate the complete video file.

In some embodiments of the present invention, the program code when executed by the processor further causes the processor to initiate a post-processing pipeline to post-process the received recording, where the complete video file is generated from the post-processed recording, and where the post-processing pipeline performs a transcoding function. In some embodiments, a metadata atom of the recording is generated in real-time as the media stream object is uploaded to the server, and a remaining amount of time is minimized to update the metadata atom on just the remaining number of bytes during the processing of the remaining number of bytes. In some embodiments, the post-processing pipeline further performs a post-processing function of audio extraction, speech-to-text conversion, video processing indexing, object detection, phoneme search, eye tracking, sentiment analysis, behavioral analysis, or gesture analysis.

In some embodiments of the present invention, the communication channel from the user device to the server utilizes a lossless protocol, where the media stream object is attached to a stream recorder on the user device, where the recording in the media stream object is segmented into a plurality of video segments, and where the receiving of the media stream object through the communication channel comprises receiving a subset of the plurality of video segments from the user device at discrete intervals. In some embodiments of the invention where the communication channel utilizes a lossless protocol from the user device to the server, the program code when executed by the processor further causes the processor to determine whether a transmission speed over the communication channel is below a predetermined threshold; and in response to determining that the transmission speed over the communication channel is below the predetermined threshold, down-sample the recorded data to reduce the rate of data transmitted through the communication channel. In some embodiments of the invention where the communication channel utilizes a lossless protocol from the user device to the server, the program code when executed by the processor further causes the processor to determine whether a transmission speed over the communication channel is below a predetermined threshold; and in response to determining that the transmission speed over the communication channel is below the predetermined threshold, replace the lossless protocol with a lossy protocol. In some embodiments of the invention where the communication channel utilizes a lossless protocol from the user device to the server, the program code when executed by the processor further causes the processor to determine whether a transmission speed over the communication channel is below a predetermined threshold and whether a post-processing pipeline has already been started; and in response to determining that the transmission speed over the communication channel is below the predetermined threshold and that a post-processing pipeline has already been started, continue the post-processing pipeline concurrently as the recorded data on the user device is stored in a buffer.

In some embodiments of the invention, the communication channel utilizes a lossy peer-to-peer real-time protocol, where the user device functions as a first peer in the communication channel, and where the server functions as a second peer in the communication channel. In some embodiments where the communication channel utilizes a lossy peer-to-peer protocol, the program code when executed by the processor further causes the processor to determine whether a direct connection between the user device and the server has failed; and in response to determining that the direct connection has failed, use a second server to relay traffic between the user device and the server, where the second server resides on the public internet, and where the second server is a TURN (Traversal Using Relays around Network Address Translators (NAT)) server.

In some embodiments of the present invention, the media stream object further contains a recording from a front-facing camera. In some embodiments, media stream object further contains a recording of a user annotation on the screen of the user device and a recording from a camera on the user device. In yet some embodiments, the media stream object further contains a superposition of a recording from a front-facing camera on the user device, and a recording from a back-facing camera on the user device.

In another aspect, the present invention is a non-transitory, computer-readable storage medium storing executable instructions, the instructions when executed by a processor, causes the processor to perform the aforementioned steps for sharing media instantaneously and asynchronously.

In yet another aspect, the present invention is a non-transitory computer-readable storage medium for sharing media asynchronously, the storage medium comprising program code stored thereon, that when executed by a processor, causes the processor to first establish a communication channel between a user device and a server; receive, through the communication channel from the user device, a media stream object containing a first recording and a second recording initiated on the user device, where the first and the second recordings are received as they are recorded on the user device, where the first recording is of a user annotation on a screen of the user device, and wherein the second recording is from a camera on the user device; store the recording to permanent storage as the recording is received; initiate a post-processing pipeline to post-process the received recording; receive a publication request from the user device, where the publication request is received from a user at a publication request time; and in response to receiving the publication request, make the recording accessible to one or more viewers within an immediate time frame by generating, from a post-processed recording, a complete video file ready for download by the one or more viewers, wherein the immediate time frame is a time to upload a remaining number of bytes to the server from the publication request time plus a time to complete post-processing the remaining number of bytes to generate the complete video file.

In yet another aspect, the present invention is a system for instantaneous and asynchronous media sharing, the system comprising a user device having a display, a camera, and a first memory; a server comprising a second memory and a data repository; a telecommunications-link between the user device and the server; and a plurality of computer codes stored on the first memory and the second memory respectively, where the plurality of computer codes when executed causes the server and user device to execute a process comprising the aforementioned steps.

In yet another aspect, the present invention is a computerized server comprising at least one processor, a memory, and computer codes stored thereon. The server when connected to a user device, and the computer codes when executed by the processor, causes the processor to execute a process comprising the aforementioned steps.

Yet other aspects and embodiments of the present invention include the methods, processes, and algorithms comprising the steps described herein, and also include the processes and modes of operation of the systems and servers described herein. Other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which.

DETAILED DESCRIPTION OF THE INVENTION

Figure 1A:
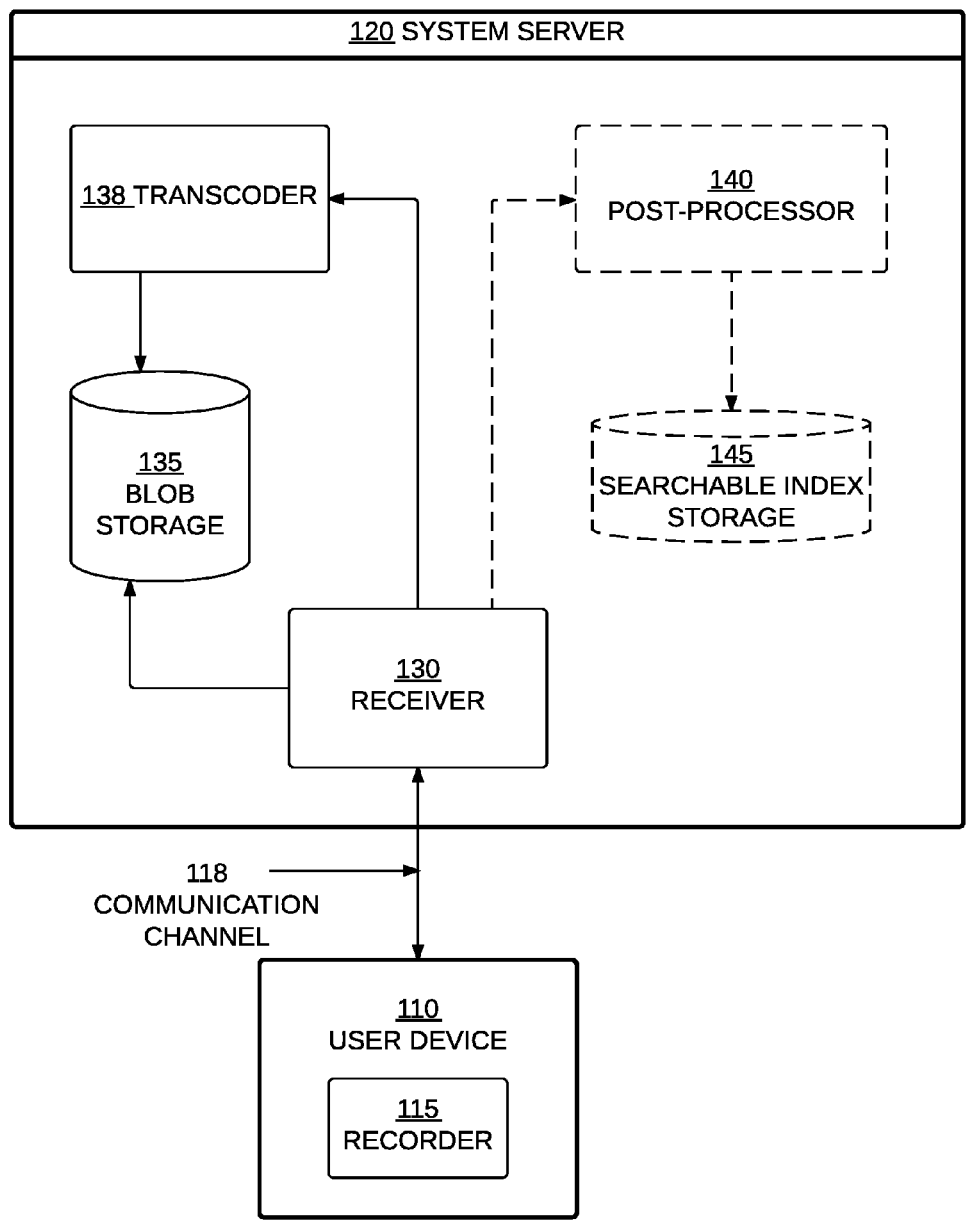
FIG. 1A is an illustrative system architecture diagram, according to one embodiment of the invention.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Illustrative Definitions

Some illustrative definitions are provided to assist in understanding the present invention, but these definitions are not to be read as restricting the scope of the present invention. The terms may be used in the form of nouns, verbs or adjectives, within the scope of the definitions. Some definitions are referenced from Wikipedia, the Mozilla Developer Network, the WebM Project, the World Wide Web Consortium, and Stackoverflow.

"LOOM" is a trademark name carrying embodiments of the present invention, and hence, the aforementioned trademark name may be interchangeably used in the specification and drawing to refer to the products and/or services offered by embodiments of the present invention for instantaneous asynchronous media sharing. "LOOM" may also be used in this specification to describe the overall system and processes of the invention, as well as the company that provides such services.

"Instantaneous sharing" means that a media recording is ready to be shared and consumed as soon as a user completes the recording process.

"Communication Channel" refers to a virtual end-to-end computer network channel in the present disclosure. A communication channel may utilize lossless communication protocols that employ reliability schemes such as error detection, correction, and automatic retransmission; alternatively, a communication channel may rely on low-latency but loss-tolerating protocols that are more desirable for real-time applications. Furthermore, in the present disclosure, a specified communication or networking protocol applied through an established communication channel may be viewed as a type of the communication channel.

"Web Real-Time Communication (WebRTC)" is a standard that defines a collection of communications protocols and application programming interfaces that enable real-time, but potentially lossy, communication over peer-to-peer connections. WebRTC allows web browsers to request resources from backend servers as well as real-time information from browsers of other users, thus enabling applications like video conferencing, file transfer, chat, or desktop sharing without using either internal or external plugins. WebRTC applications often require additional signaling services, a process via which network and media metadata are exchanged. Nonetheless, once signaling has taken place, media such as video, audio, and data may be streamed directly between clients, avoiding the performance cost of transmission via an intermediary server. In the present disclosure, WebRTC may be considered as an example of a communication channel type for a communication channel that utilizes this protocol.

A "Real-time" transmission generally refers to the immediate transmission of data as the data is collected, curated, or recorded.

"Streaming" generally refers to the transmission and/or reception of data over a computer network communication channel in a continuous flow to allow the data to be presented or consumed while subsequent data are still being delivered by a provider, or while subsequent data are still being received.

A "WebSocket" is a computer communications protocol that provides full-duplex communication channels over a single Transmission Control Protocol (TCP) connection.

In comparison to WebRTC, WebSocket is designed for bi-directional communication between a client and a server. WebSocket allows the streaming of audio and video, as well as other data. In addition, WebSocket offers ways of uploading data without streaming in real-time, that is, asynchronously. WebSocket may be considered another example of a communication channel type. WebSocket also differs from WebRTC as it is built upon TCP, which provides reliable and ordered delivery of data packets while also being limited by retransmission and buffering delays. Thus, ebSocket is preferable with faster network connections and applications that do not have stringent real-time requirements.

A "Media Stream" interface or object represents a stream or sequence of media content, such as audio or video-related data, often in the form of bitstreams, bytestreams, or packetstreams. A media stream object may be represented by a simple URL string, also known as a handle, to reference data stored in a bit stream, packet stream, or series of blob objects. In some embodiments, a media stream object may contain one or more Media Stream Track objects, each representing an audio or video track.

"Peer-to-Peer (P2P)" computing or networking is a distributed application architecture that partitions tasks or workload between peers. Peers are equally-privileged, equipotent participants in the application. Each peer may be considered a node in a peer-to-peer network.

A "Blob" object refers to a file-like object of immutable, raw data. In the most general terms, a blob refers to a data segment of a particular type or size. A binary blob may refer to a binary-only piece of data or software. A Blob may also be used to describe a collection of binary data stored in a database.

"Traversal Using Relays around Network Address Translators (NAT)" or "TURN" for short refers to a network protocol used to assist in the discovery of paths between peers on the Internet. TURN may be used with various networking protocols such as Transmission Control Protocol (TCP) or User Datagram Protocol (UDP). TURN uses a public intermediary relay to relay packets between peers, and such a relay may be called a "TURN Server." A TURN server may be necessary when two peers fail to connect directly, for example, when one of the peers is behind a symmetric NAT and the other peer is behind either a symmetric NAT or port-restricted NAT. TURN servers reside on the public internet.

A "Content Delivery Network (CDN)" is a system of distributed network nodes and servers that deliver or serve web or Internet contents to end-users based on the end-users' geographic locations, as well as other performance optimizing criteria. A CDN may be a client-server system, or a peer-to-peer system.

Overview

With reference to the definitions above and the figures provided, embodiments of the present invention are now described in detail.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Video communication is becoming an increasingly important way of knowledge sharing and information exchange in various fields such as education, business, and marketing. However, with existing technologies, streamable media such as audio and video are often associated with non-trivial waiting times while the media is uploaded, processed, and stored, before being made sharable on network-connected devices. For example, when videos are used for business purposes, the faster they are made available for sharing, the better the user experience. The present invention proposes to tackle the problem of unpleasant wait times by providing a system for asynchronous media sharing instantaneously after media are created, by uploading and post-processing a media stream associated with a given recording at the time the recording is being made.

Some illustrative benefits of the present invention include, but are not limited to, immediate consumption of curated media, which may be lengthy in duration; instant psychological gratification for the curator, and much better user experiences where both media curation and media viewing become less cumbersome. The turnaround to consume curated content becomes extremely fast as well, to the extent of being instantaneously available upon completion of a recording, may it be a screen recording, camera capture, or user annotation and dictation, with bottlenecks only by a curator's network connection quality and server processing capabilities. With such advantages, there is increased propensity for people to record more media content and to record longer media durations. With instantaneous asynchronous video sharing, user may further enjoy the benefit of full context immersion, as facilitated by screen sharing, which makes facial expressions and conversation tonality available to participating users.

Compared with real-time video streaming technologies that often trade-off between packet loss and delays, the present invention is not limited to real-time uplink and/or downlink data streaming applications but instead, provides an asynchronous solution by combining real-time uplink transmission of high quality videos, real-time backend stream processing, and smart quality of service management techniques to enable instantaneous media curation and sharing with minimal delay and timing overheads.

System Architecture

Broadly, embodiments of the present invention relate to methods and systems for sharing media instantaneously and asynchronously. FIG. 1A shows an illustrative system architecture 100 for one embodiment of the invention. A user device 110 contains a recorder 115, which is capable of recording from a display screen on user device 110, from an application displayed on user device 110, or from one or more optical cameras on user device 110. User device 110 is connected to a receiver 130 within a LOOM system server 120 through a communication channel 118. Communication channel 118 may be established between user device 110 and LOOM system server 120 before the recording is initiated, while the recording takes place, or after recording has been completed. Receiver 130 may send the received recording directly to a storage unit such as blob storage 135 on system server 120. In some embodiments, such storage units may be permanent, and maybe used to store raw data or post-processed data such as transcoded data; in some embodiments, such storage units may be non-permanent, thus allowing temporary caching of the data stream while the data stream is handled by a post-processor, or post-processing pipeline, such as dedicated transcoder 138 or general post-processor 140. Each of transcoder 138 or post-processor 140 may be physical or logical components implemented in dedicated or general purpose hardware. In some embodiments, received data are first post-processed through a transcoder 138 before the transcoded media recording is sent to blob storage 135. Transcoding may be considered as a post-processing process, as raw or even post-process data is converted from one format to another. Concurrently or in tandem, the received recording may optionally be post-processed through a post-processor 140, which may perform functions such as audio extraction, object detection, speech-to-text conversion, phoneme search, eye tracking, sentiment analysis, behavioral analysis, and, and gesture analysis. The post-processor may further be connected to optional searchable index storage 145. Although not shown explicitly, post-processed media recordings generated by post-processor 140 may also be passed to transcoder 138, stored in blob storage 135, or sent to any other permanent or non-permanent storage units or control components that provide video hosting and sharing services such as on-demand replay, streaming, video searches, and user management.

Figure 1B:
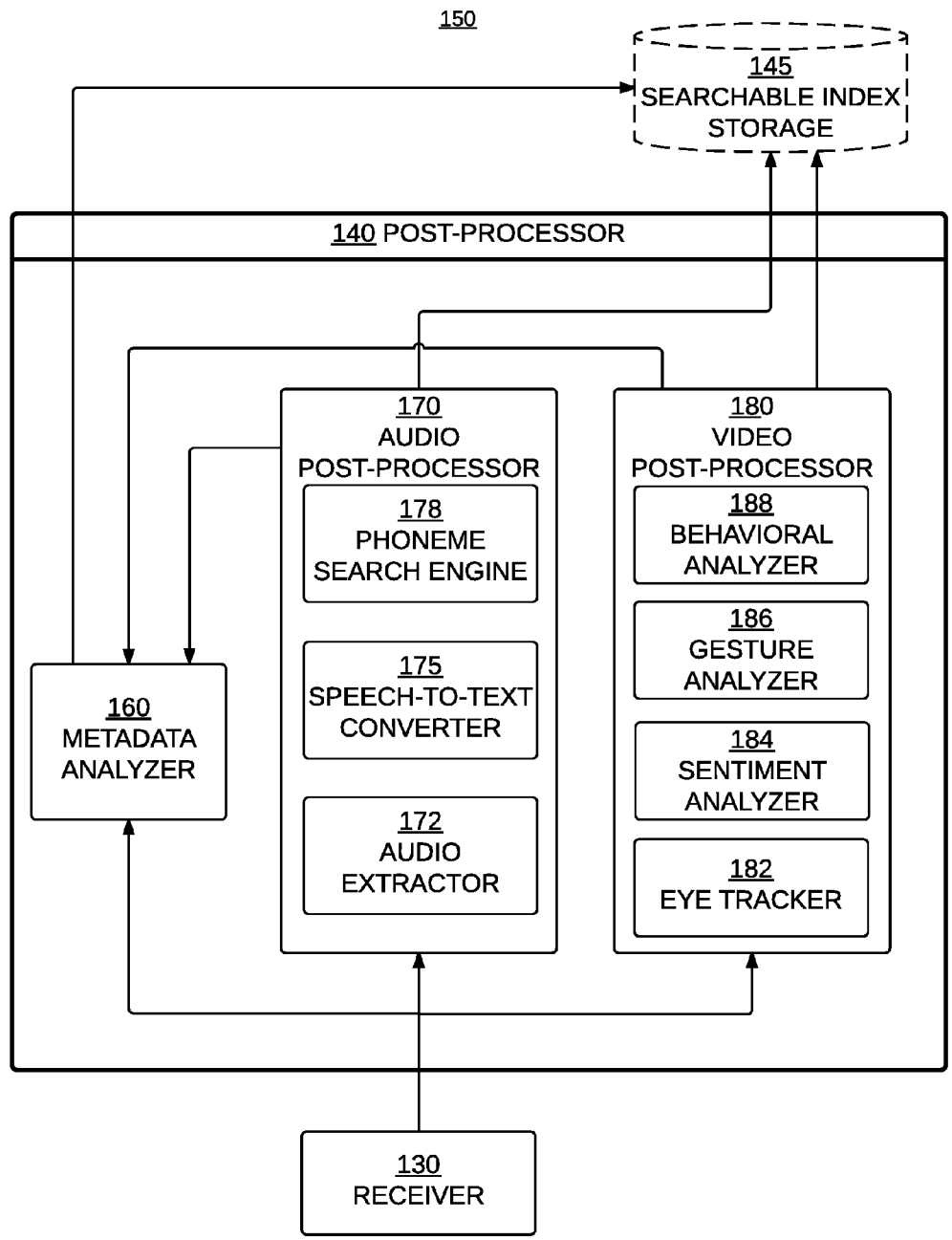
FIG. 1B is an illustrative architecture diagram for the post-processor, according to one embodiment of the invention.

FIG. 1B shows an illustrative architecture diagram 150 for post-processor 140. In some embodiments, media data received at receiver 130 may get sent to metadata analyzer 160, audio post-processor 170, and/or video post-processor 180. The metadata analyzer 160 analyzes any metadata that may already be present in the received media data, and may further generate individual metadata items as needed. In audio post-processor 170, audio extraction may be performed by an audio extractor 172, speech-to-text conversion may be done by a speech-to-text converter 175, and phoneme search may be performed by a phoneme search engine 178. Audio data may be processed concurrently or in tandem in different orders through these modules. In video post-processor 180, video features including, but are not limited to, eye movements, sentiments, gestures, and behaviors, may be analyzed by eye tracker 182, sentiment analyzer 184, gesture analyzer 186, and behavioral analyzer 188. As in the audio post-processor, video data may be processed concurrently or in tandem in different orders through these modules. Audio post-processor 170 and/or video post-processor 180 may feed their results back into metadata analyzer 160. In some embodiments, the recording received is streamed asynchronously as it is being recorded. In some embodiments, the media data received may be from an upload of a recorded media file. In both cases, a self-contained data unit containing information about the video file called a metadata atom may be used for playing a streamable media file. Metadata analyzer 160 may generate a metadata atom in real-time as the media stream object is uploaded to the server if such a metadata atom does not already exist, or move it in real-time to the beginning of a media file if it already exists. Metadata analyzer 160 may write a new file with that metadata atom at the front into searchable index storage 145. The rest of the upload from the receiver, or processed versions from video post-processor 180, may be streamed and tacked onto that metadata atom so that the file is immediately ready for consumption and storage as soon as the upload completes.

Figure 2:
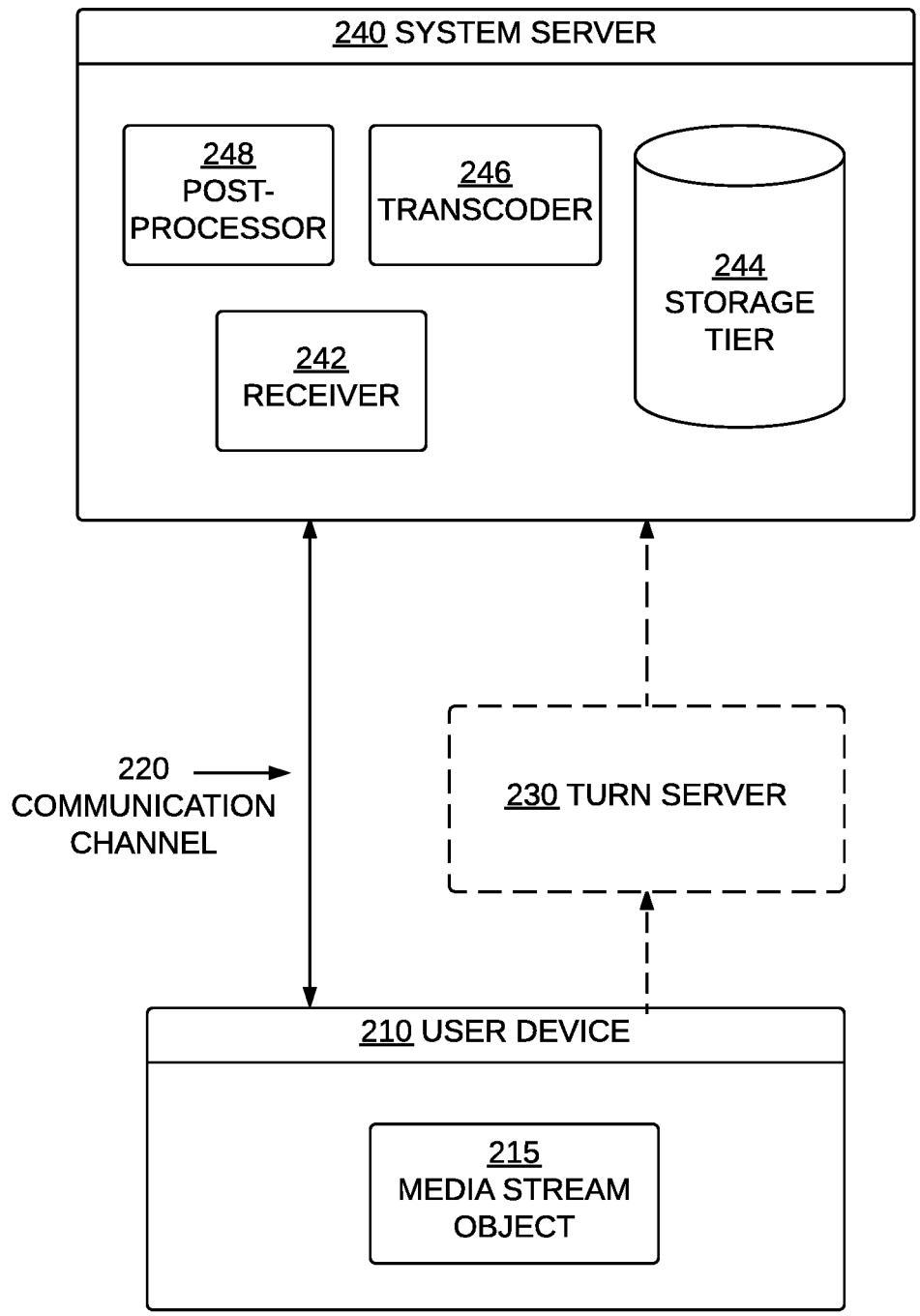
FIG. 2 is a block diagram illustrating data flow for curated media recording, according to one embodiment of the invention.

More particularly, FIG. 2 shows a schematic block diagram 200 illustrating data flow for curated media recordings, according to one embodiment of the present invention. A recording generated on a user device 210 may include a combination of screen capture, front-facing camera capture, back-facing camera capture, and user annotations and dictations, as discussed with reference to FIGS. 4-8. Upon the start of a recording session, a screen display on user device 210, or any application running on user device 210 and displayed on the display screen may be captured. A LOOM client application on user device 210 may then set up a media stream object 215 on the user device containing the recording, and upload the media stream object to a system server 240 through a communication channel 220 established between user device 210 and system server 240. Communication channel 220 may employ any lossless transmission protocols such as WebSocket, or any lossy and potentially real-time protocols such as WebRTC. In some embodiments, a TURN server 230 may optionally be needed when a lossy transmission protocol such as WebRTC is used, if symmetry between the two ends of the communication channel cannot be achieved, as will be further described in more detail below. A receiver 242 in server 240 receives the transmitted media stream object which contains media recording captured by user device 210. The received media recording may then be stored in a storage tier 244, or be sent to a transcoder 246. The received media recording may also be sent to a post-processor 248 before or in parallel to the transcoding process. Post-processed data, included transcoded data may then be stored through storage tier 244. In other words, storage tier 244 may store raw or post-processed media recordings in any format appropriate for media storage and/or sharing. For example, storage tier 244 may be a blob storage. In some embodiments, storage tier 244 may be a content delivery tier, and LOOM system server 240 may serve as a node within a content delivery network (CDN). In some other embodiments, system server 240 may be connected to a CDN, or a parallel storage that is connected to a CDN for redundancy. Connection to and interaction with a CDN allows for immediate sharing of the raw recording content as soon as the recording process is completed. As previously discussed, while media stream object 215 is transmitted through communication channel 220 to system server 240, system server 240 may optionally initiate a post-processing pipeline internally by sending the received media recordings to post-processor 248. Furthermore, a recording user may instruct through user device 210 whether recorded content may be shared immediately. Upon the receipt of a publication request for the recorded content as collected from or input by the user though user device 210, system server 240 may end a currently progressing post-processing pipeline before making post-processed media content available. For example, in response to receiving the publication request, system server 240 may make the received raw recording or post-processed recording accessible to one or more viewers within an immediate time frame, wherein the immediate time frame is a time to upload or receive a remaining number of bytes to the server, from the publication request time, plus a time to complete processing the remaining number of bytes to generate a complete video file for download by the one or more viewers at the server. If a post-processing pipeline has been started. In some embodiments, system server 240 may end the recording by continuing to receive the data recording upload until an end of file signal is detected, and start a new post-processing pipeline within the server to post-process the received recording. If immediate viewing of a raw, transcoded or post-processed media stream is desired, the previous step as discussed may be modified to stream raw data as received by receiver 242 to both storage tier 244 and/or post-processing pipeline 248 in parallel or in tandem. In other words, every process may be fully streamed, where media data is handled on a byte-by-byte, frame-by-frame, or segment by segment basis. As a post-processing pipeline is completed, post-processed recordings may be made accessible to one or more viewers. In some embodiments of the present invention, the post-processing pipeline may perform post-processing functions including, but are not limited to, transcoding, audio extraction, video processing indexing, object detection, speech-to-text conversion, phoneme search, eye tracking, sentiment analysis, behavioral analysis, or gesture analysis. Thus, in some embodiments, transcoder 246 may be implemented as a particular instance of post-processor 248.

Figure 3:
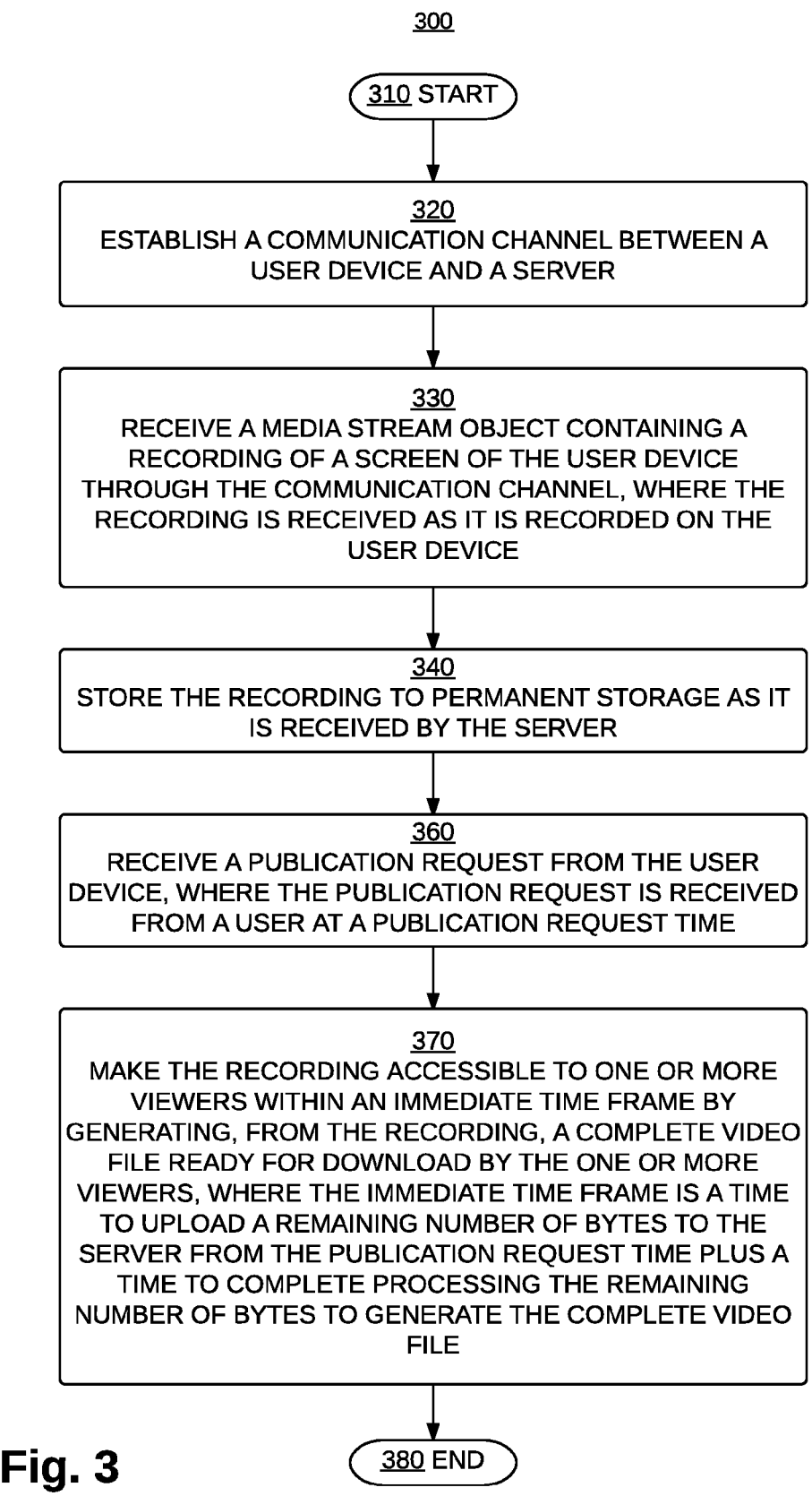
FIG. 3 is a flowchart illustrating a process for instantaneous asynchronous media sharing, according to one embodiment of the invention.

FIG. 3 is a flowchart 300 illustrating a process for instantaneous asynchronous media sharing, according to one embodiment of the invention. Upon initiation at step 310, the LOOM system may establish a communication channel between a user device and a LOOM server at step 320. Next, the LOOM system receives a media stream object containing a recording of a screen of the user device through the communication channel, where the recording is received as it is recorded on the user device, at step 330. The LOOM system further stores the recording to permanent storage as the recording is received by the server at step 340. The LOOM system server may optionally initiate a post-processing pipeline to post-process the received recording. In either case, whether with or without a post-processing pipeline, the LOOM system receives a publication request from the user device, where in the user request is received from a user through the user device at a publication request time at step 360; in response to receiving the publication request, the recording is made accessible to one or more viewers within an immediate time frame, wherein the immediate time frame is a time to upload a remaining number of bytes to the server from the publication request time plus a time to complete processing the remaining number of bytes to generate a complete video file ready for download by the one or more viewers at the server at step 370. In other words, the recording is made accessible to the viewers through the generation of the complete video file from the recording, where the complete video file is ready for download from the server by the one or more viewers. Such a generation process may simply involve completing the streamed upload of the recording and making it into a file entity, or may involve other post-processing steps as previously discussed. The process completes at step 380.

While a recording is being made and uploaded, there may be different consumption patterns. In some embodiments, the consumption pattern is a live streaming from the recording user to the server, and through the server to the viewer, and the post-processing pipeline does not need to complete before the media is consumed. In some embodiments, the consumption pattern may be asynchronous video messaging, for which a subset of the post-processing pipeline must be finished or completed shortly or immediately after the publication request is received, in order for the post-processed recording to be made accessible. In some embodiments, the publication request is in the form of an end of transmission or end of file signal. In such cases, the post-processing process may be automatically completed upon the detection of such signals. In addition, in some embodiments, a viewer may have the same access as the uploading user to open-source or proprietary media container formats and players, such as a WebM-playable browser, where WebM is an open Media file format. The post-processing may then simply consist of uploading the video to a storage layer that backs it up to a CDN, and raw data may consumed directly. In another example where a viewer's browser is not WebM-playable, the post-processing may include a transcoding step, where a final conversion to the MPEG-4 or MP4 media format is performed, and metadata such as defined through a metadata atom is constructed as part of the streamed transcoding process. Metadata atoms are discussed in more specific embodiments below. In both cases, the time-to-consumption, when bytes are uploaded as soon as they are recorded, is the time that it takes for the server to process the byte stream until the last byte is processed. The parallelism in recording, uploading, and streamed post-processing ensures that such time-to-consumption is very fast to seem almost instantaneous. Alternatively, if transmission speeds are lower than optimal, some down-sampling operations such as compressions may be performed on the recording data device first, and alternative communication protocols may be used, taking into account the quality of service desired, including but are not limited to, error rate, throughput, and uplink and downlink transmission delays.

FIG. 4 through FIG. 8 show illustrative screenshots for real-time recording and sharing of video screen capture, according one embodiment of the present invention. In particular, in this embodiment, both a browser window on a display screen of a user device and a front-facing video camera on the user device are recorded and uploaded in real-time to a LOOM server, and made instantaneously available for asynchronous video communication with third-parties.

Figure 4:
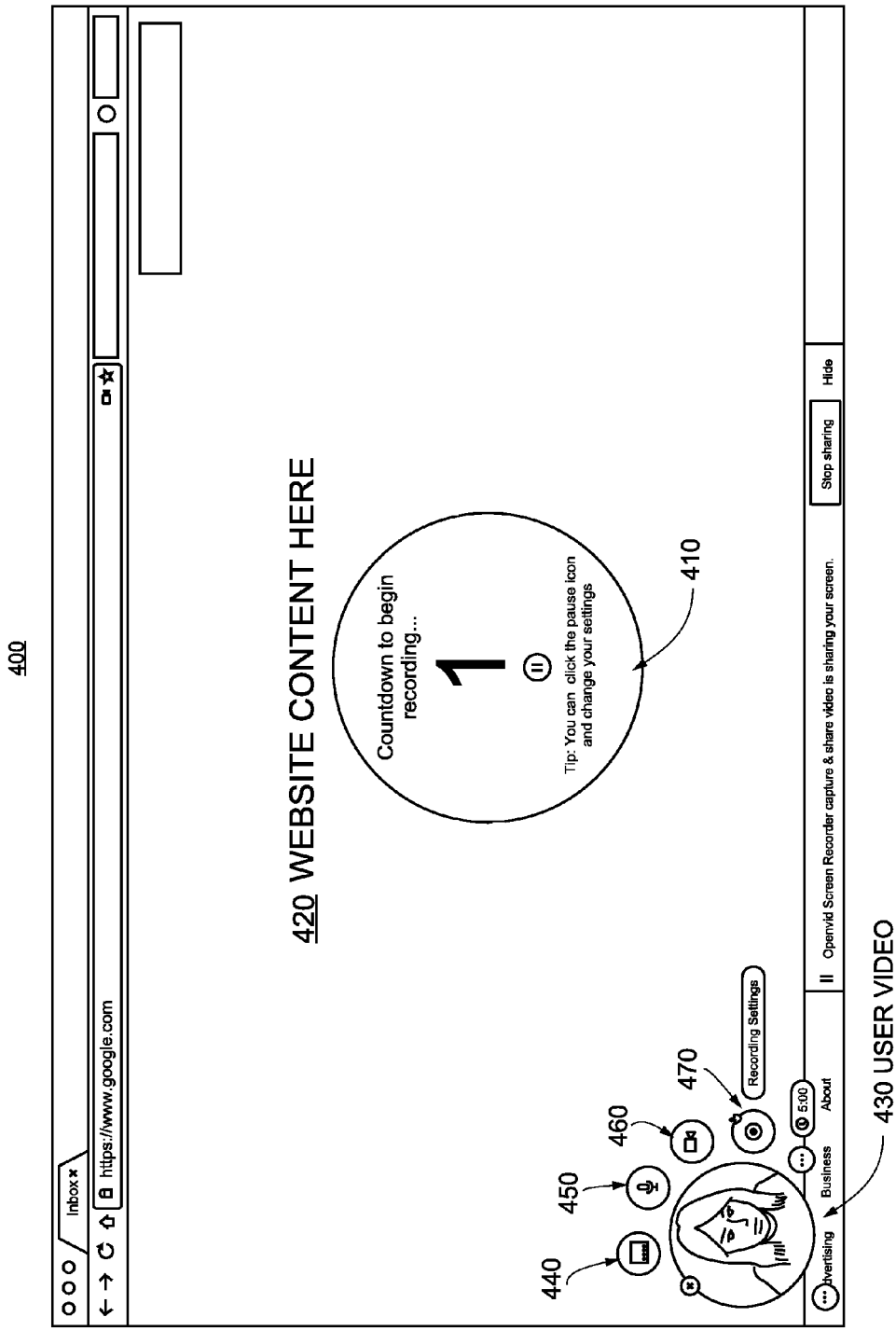
FIG. 4 is an illustrative screenshot showing a countdown to recording according to one embodiment of the present invention.

More specifically, FIG. 4 is an illustrative screenshot 400 showing a countdown to recording 410 in a web browser for one embodiment. In the background is simplified website content 420 as displayed by the web browser. In the lower left corner is a user video 430 as captured by the front-facing camera such as those available on mobile phones or laptop and tablet devices. In this particular example, the captured user video is superimposed, superpositioned, or overlapped on the screen capture. As the user is being recorded, icons next to user video 430 are displayed for various settings. For example, in some embodiments, Capture Settings 440 may allow the user to select a target window or a portion of the screen for capture. Microphone Settings 450 may allow the user to turn on or off a microphone. Camera Settings 460 may allow the user to select, or turn on or off a front-facing or a back-facing camera on the user device. Recording Settings 470 may allow the user to pause or resume the recording, or allow other characteristics of the recording to be adjusted.

Figure 5:
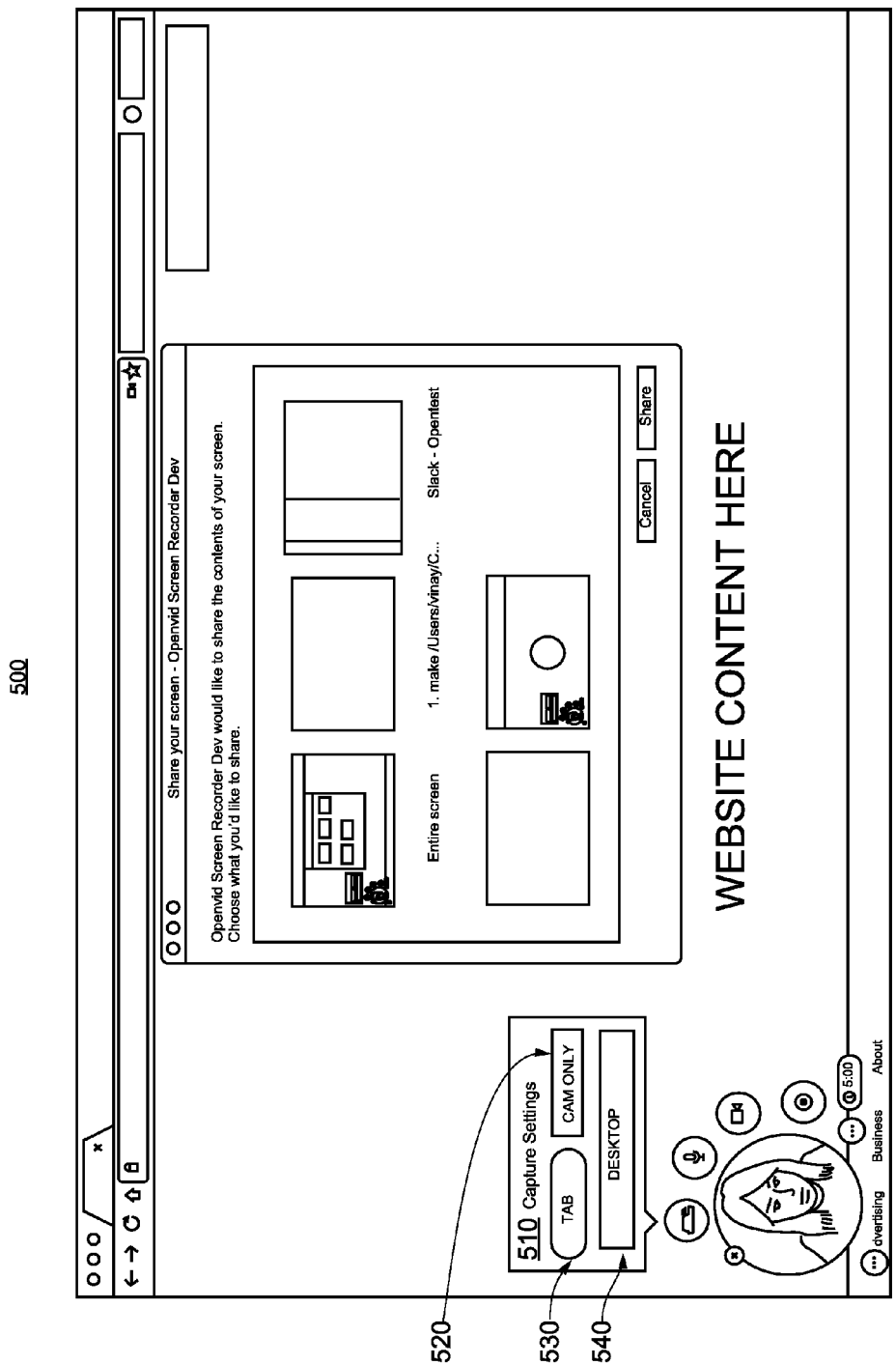
FIG. 5 is an illustrative screenshot of a user view of the application while adjusting capture settings, according to one embodiment of the present invention.

FIG. 5 is an illustrative screenshot 500 of a user view of the LOOM client application while adjusting a Capture Settings 510, which provide several options including "CAM ONLY" 520, "TAB" 530, and "DESKTOP" 540, in one embodiment of the present invention. In this example, "TAB" 530 may refer to recording the contents within a specific browser tab as well as the user, and superimposing the two recordings into a single media stream, while "CAM ONLY" 520 may refer to recording through only a physical camera on the user device. "DESKTOP" 540 may refer to recording of the entire screen or one or more selected application windows.

Figure 6:
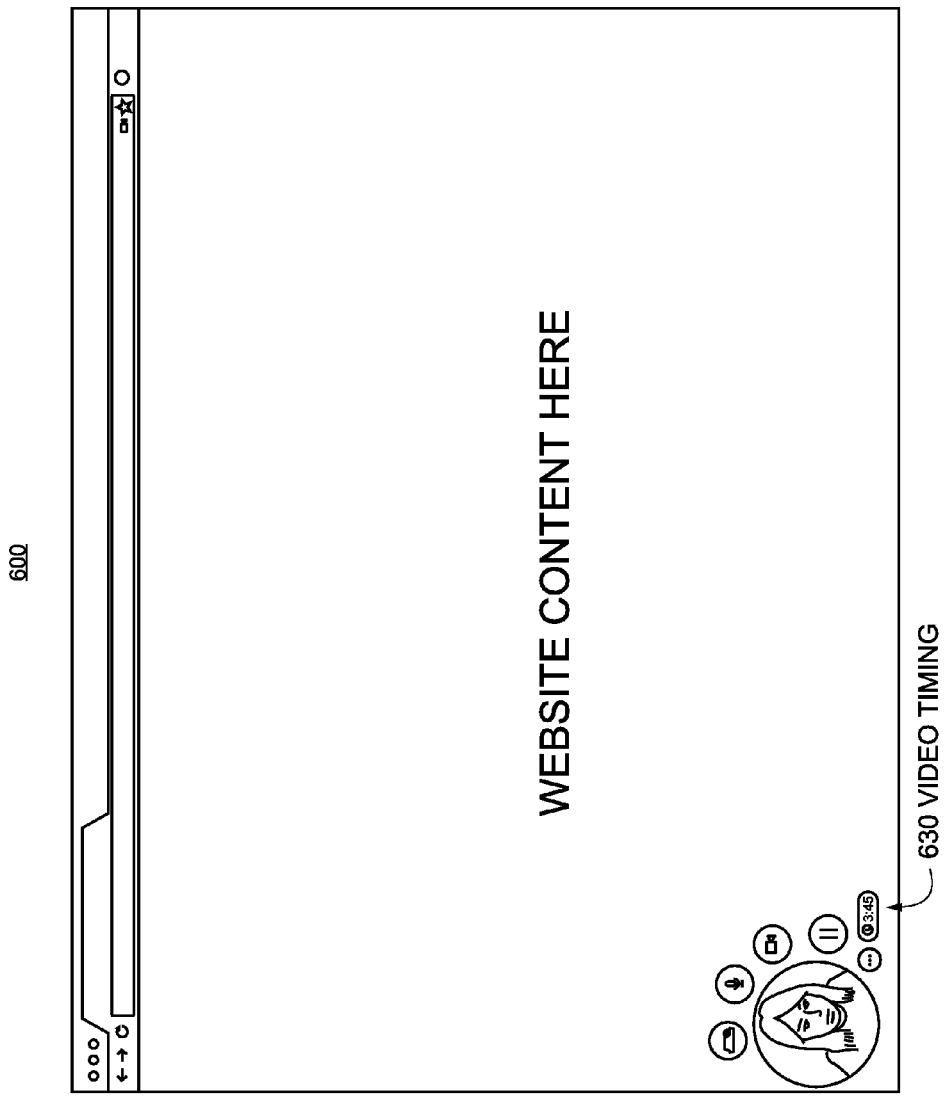
FIG. 6 is an illustrative screenshot for real-time recording-in-progress of video screen capture and camera data of a user, according to one embodiment of the present invention.

FIG. 6 is an illustrative screenshot 600 showing a recording-in-progress of a video screen capture and user capture through a camera, with Capture Settings set to "TAB". A running clock 630 may count up or count down to show a video timing, where a stop-watch-like count-up timer may allow video recording of any desirable length, while a countdown timer may limit the duration of the recorded video clip.

Figure 7:
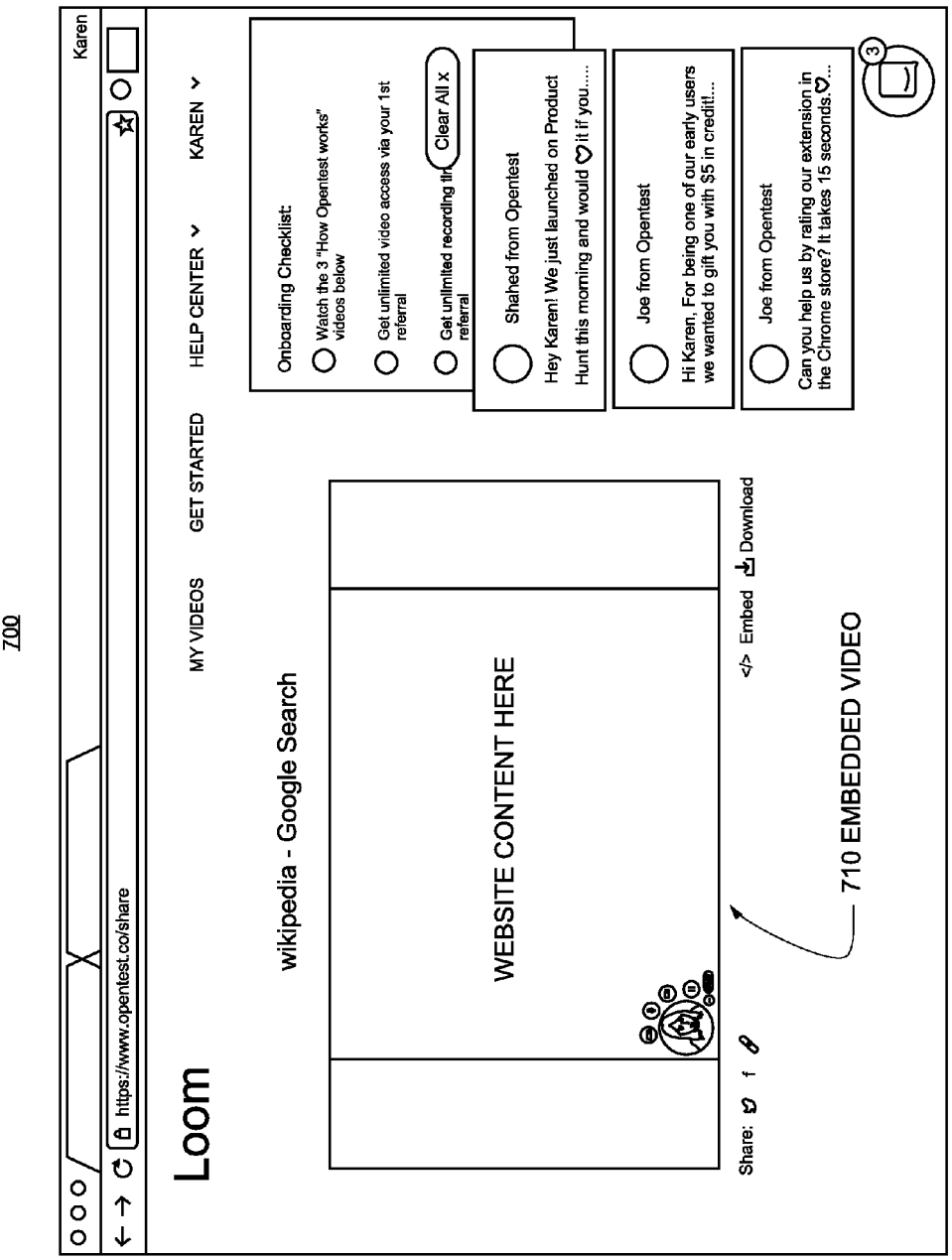
FIG. 7 is an illustrative screenshot of a website pop-up in a new browser tab shown to a user with a video just recorded, according to one embodiment of the present invention.

FIG. 7 is an illustrative screenshot 700 of a website popped up in a new browser tab shown to the user with an embedded video 710 just recorded, according to one embodiment of the present invention. Such embedded videos may be immediately consumed by the recording user as well as other viewers through various channels, for example through the LOOM video sharing platform. They may also be downloaded, or embedded in desired webpages.

Figure 8:
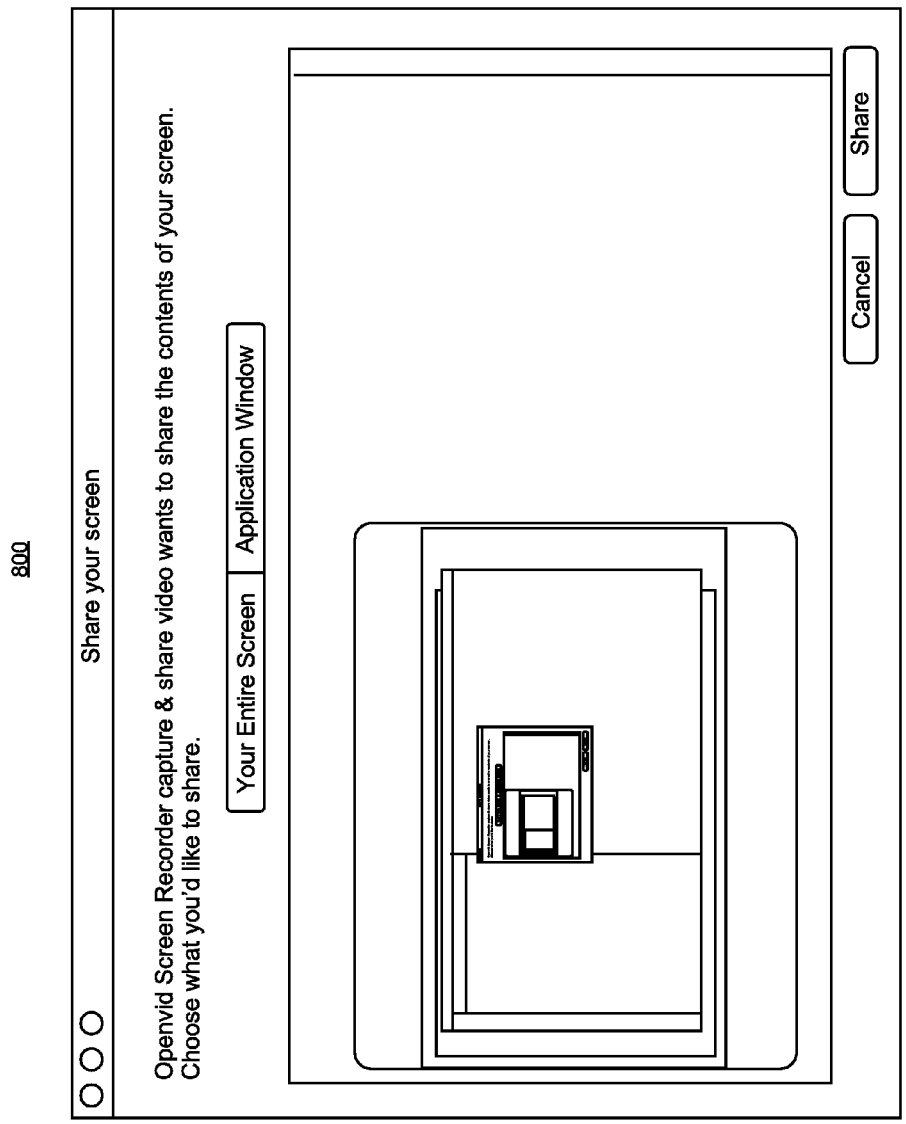
FIG. 8 is an illustrative screenshot of options presented to a user for selecting a capture target, according to one embodiment of the present invention.

FIG. 8 is an illustrative screenshot 800 of options presented to the user when "DESKTOP" is selected as the Capture Setting, according to one embodiment of the present invention. In this case, the user may record the entire screen or one or more selected application windows.

Furthermore, although not shown explicitly, in some embodiments, the LOOM system may initiate a first recording of a user annotation, which may be typed, scribbled, or dictated and speech-to-text converted on the screen display of the user device, as well as a second recording from a camera on the user device to capture the user at the same time. The system may combine such first and second recordings into a single media stream object for transmission. In yet other embodiments, a media stream object may contain a superposition of a first recording from a front-facing camera on the user device, and a second recording from a back-facing camera on the user device, or any combinations of screen recording, camera capture, and user annotation therein.

The present invention as disclosed herein is structurally different from conventional video hosting and sharing services in that every step of the recording process is handled in the form of a stream. Although the present discussion has focused on capturing media on the client side, a media recording may in general happen on a client, or a server, and it can be viewed as an upload process, with every step necessary for consuming the media in a streamed format. In other words, media recording, uploading, post-processing, storage, and sharing may occur concurrently, to achieve an instantaneous effect in the media curation and sharing process. More specifically, the user device may simply obtain a handle of a byte stream and send the byte stream to the system server, wherein the byte stream is obtained through or represented by a recording process. The system may then obtain the byte stream handle on the system server and stream these bytes to any other processes that readily accept a byte stream, such as uploading to a blob storage, transcoding, transcribing, audio extraction, speech-to-text conversion, video processing indexing, object detection, phoneme search, eye tracking, sentiment analysis, behavioral analysis, and gesture analysis. Moreover, different processes or modules in the post-processing pipeline may be extensible, and may connect in any reasonable order. Unlike many existing streaming technologies or protocols with coarse data resolution, where chunked uploads comprise data on the scale of MegaByte (MB) each, some embodiments of the present invention facilitate quick turnaround in each of the recording, transmission, and post-processing steps by using finer data resolution with byte-sized chunks, or packets that may comprise hundreds or thousands of bytes only. Such bytestreams or small-packet streams take advantage of the fast processing speeds of computerized systems so no unnecessary delays are incurred in any step of the recording, transmission, and post-processing pipeline. In some embodiments, data bytes may not be stored anywhere on disk before reaching the server, except for the purpose of backup and recovery, in which case such storage may plug into the pipeline as a "backup" step that occurs concurrently with other post-processing steps such as transcoding and transcribing. For example, blob storage 140 in FIG. 1 may be for backup purposes. Storage at any stage before the data stream reaches the server may not be strictly necessary. Such methodology allows for immediate consumption of curated or uploaded media.

Moreover, the present invention differ from existing video conferencing technologies. In the latter, metadata atoms are generally localized per-packet. In a software such as Skype, a connection is first established to a peer. Then the software would encode small datagram packets from the originating peer, typically compressing aggressively to ensure that the packets are received as fast as possible. Those packets are then timestamped and sent over UDP. If a packet is received on the recipient peer out of order, it may often be dropped, since the consumption pattern is synchronous, or real-time, and such software has often deemed it unnecessary and blocking to the experience to ensure all packets are received and sent between the peers. Thus, if a packet is not received at all, it is most likely not recovered. This approach can be thought of as a series of very small, non-seekable videos hitting each peer. It is acceptable for these videos to be lost as to not disrupt the consumption experience. In the LOOM system, by contrast, peers have one singular message for each transmission that must be seekable, recoverable, and usually with intentional data loss in some cases. These are, for instance, data lost to intentional compression mechanisms to save space rather than data loss because it may be "too late" for such data to be consumed, or because the network may drop the video since it was sent over UDP.

In short, the present invention comprises new and novel systems and methods for streamed recording, uploading, and processing. As long as the recording process is streamable to the server and the server can grab and handle received data as a stream, the server may also stream any other processes required for media consumption, including transcoding, thumbnail extraction, storage into a CDN, and such.

In what follows, several additional embodiments of the present invention with different methods of recording are described.

Recording with Stream Recorder and WebSocket

For some relatively new browsers such as Google Chrome, Microsoft Edge, Firefox, Safari, and Opera, a MediaRecorder API is available, and the lossless WebSocket transmission protocol may be used for data transmission through the communication channel, such as communication channels 118 in FIG. 1 or 220 in FIG. 2. Accordingly, a LOOM system as described herein may attach a media stream object such as media stream object 215 to a stream recorder 115 either using the MediaRecorderAPI or a recorder built with native code to listen to the media stream. The system may create or establish a WebSocket connection from user device 110 or 210 to system server 120 or 240 as communication channels 118 or 220. In this particular example, a recorded media stream may already have raw recording bytes, such as in the WebM format with VP8 or VP9 compression standards. The user device may segment the recorded data in the media stream object 215 into smaller chunks, such as bytes, packets, or blobs, and send series of chunks from the user device to the server at discrete intervals, for example, every few hundred milliseconds, automatically over the lossless channel, or directly to the storage layer, such as an Amazon S3 storage layer. The size of the chunks may be optimized with respect to details such as page size, server latency, transmission speed, resolution, and other properties of the application and system.

Recording with WebRTC

For older Browsers without access to a MediaRecorder API, a lossy and real-time protocol such as WebRTC may be used. In this example, media stream object 215 may be a WebRTC stream, which may be attached to a first peer such as user device 110 or 210, and to a second peer such as server 120 or 240. In other words, the system may create the second peer as a WebRTC server-peer on backend servers 120 or 240, and connect the user device to the server through a virtual peer-to-peer connection. In some embodiments, if the symmetry of the network between the user device and the server does not match, or if a direct peer-to-peer connection fails for any reason, the connection data between the user device-peer and server-peer may be relayed through a TURN server 220. Backend servers 120 or 240 may then listen to the media stream that is getting sent to the server-peer through the TURN server and record the received bit or byte stream. As received data are recorded, the system may stream them to the storage layer.

In both cases as discussed above, server 120 or 240 may transcode received and/or post-processed media data to any desirable media formats such as MP4 for wider device availability, while also serving in simpler formats such as WebM immediately for WebM-capable devices, such as Chrome, Firefox browsers on desktops, and Safari and Opera browsers on mobile devices.

In some embodiments, the LOOM system may use a lossless protocol initially, then determine or detect if a transmission speed or some other performance characteristics over an established communication channel is below a certain threshold. Upon determining that the transmission speed and/or a performance characteristics is below the threshold, the system may down-sample the recorded data, for example by reducing the number of frames per second and/or the resolution of the transmission to reduce the rate of data transmitted through the communication channel. If the transmission speed is still insufficient to achieve a given delay constraint, then LOOM system may replace the lossless protocol with a lossy protocol, which may cause less delay but also lower reliability. If a post-processing pipeline has already been started and a sudden drop in transmission speed is detected, the system may keep the pipeline going while buffering the recorded data on the user device, if such a buffer is available.

Streamed Recording with Metadata Atom Auto-Shifted

In some embodiments of the present invention, the streaming approach as disclosed is extrapolated one step further and metadata atoms are moved to the beginning of a file in a consecutive, streaming manner, for both the case of complete media files being uploaded to a server and the case of streamed media files being recorded while being concurrently uploaded asynchronously. A metadata atom is a self-contained data unit that contains information about the video file. In MP4, this is called a moov atom. This atom may be crucial for playing a streamable media such as video or audio, and playing of a media file may not be started until a metadata atom is located.

In some embodiments of the present invention, the metadata atom is generated in real-time as the media stream object is uploaded to the server or moved in real-time to the beginning of a media file. There are two reasons why this is useful. First, some media players neither support HTTP byte range requests out of the box, nor contain logic to check the end of a file for the metadata atom. Nonetheless, most browser vendor players have this kind of checking logic built-in. Second, many videos taken on a mobile device always tack the metadata atom onto the end of a file to save CPU from having to shift all the frames in the media over in order to tack it onto the beginning of the file. Battery life is also saved in this manner.

A similar method for efficiently handling metadata atoms is proposed in the following two categories of embodiments. For some embodiments in the case of uploading a recorded media file, the system may construct the metadata atom by either retrieving file attributes using a Unix system call stat, grabbing a blob size of the file, or, if the metadata atom already exists, checking for it at the end of the file. Then the system may upload that metadata atom first to the server and the server may write a new file with that metadata atom at the front. The rest of the upload is streamed and tacked onto that metadata atom so that the file is immediately ready for consumption as soon as the upload completes. For embodiments in which the recording is streamed asynchronously, the system may construct the metadata atom by counting the bytes sent to the server. At the end of the recording, the server has all the information needed to finalize the metadata atom and to store it immediately, and follow the same method above where the rest of the recording is added to the new metadata atom. Thus, a remaining amount of time may be minimized to update the metadata atom on just a remaining number of bytes during the processing of a remaining number of bytes.

Furthermore, in the asynchronous streaming case, since the post-processed stream of the recording is continuously being received in the server, the time taken from the publication request time at which a user request is input by a user through the user device, to the time when the video becomes available for consumption, is very short compared to many other existing technologies, as shown in Table 1 below. This is because the turn-around time is simply the time needed to upload a remaining number of bytes to the server from the publication request time, plus a time to complete the post-processing pipeline on the remaining number of bytes at the server from the time at which streaming or upload ends. In various embodiments, this turn-around time may be on the order of less than 5 seconds for any video file of having a five-minute, ten-minute, or hour-long duration. Thus, in both cases, the user may experience an "instant" or "instantaneous" rendering of the recorded video, which is highly desirable to improved user experience. In the case of asynchronous streaming, the creator of the media and the server perform meaningful work in tandem. The end result is to have the recorded media ready for consumption almost immediately upon creation. Such instant gratifications and ease of use may further promote and encourage users to create a larger number of longer videos.

Experimental Results of the Present Invention

Experiments have been performed to test an embodiment of the present invention and compare with existing applications for video uploading, in terms of the time it takes for a complete video to become available for download, upon completion of a video recording process, where the recorded videos may be of various lengths. The numerical results are listed in Table 1 below, where projected valued are labelled with an asterisk. The time delay between the termination of a video recording process and the time at which the corresponding completed video file becomes available for download is define as the waiting time. Existing applications tested include HYFY, VIEWEDIT, and WEBEX. The network used had a download speed of 18.98 Mbps, an upload speed of 1.45 Mbps and the server was located in Chicago. The resulting waiting times were obtained by using a stop watch to measure the amount of time experienced by the user from the time "end recording" is clicked, to the time at which the video becomes available for viewing. It should be noted that HYFY does not support video lengths of more than 3 minutes for its free version of the product, so an extrapolation was done for the 5-minute video. Also, WEBEX upload was very slow, and therefore results for videos exceeding 1 minute in duration were projected. These and other projected scenarios are shown in Table 1 with an asterisk. Since the measured values showed a linear relationship between waiting time and video length, projections or extrapolations were made according to the same linear relationship. The uncertainty in the measurements is about 1 second, and the uncertainty in the projection values is plus or minus 10%. Note waiting times for LOOM may contain jitters instead of being a smooth linear curve, since internal processing of larger chunk sizes may have an impact on the waiting time, on the scale of seconds.

TABLE 1

Waiting time versus video length for different applications

| Video Length | Waiting Time for Different Applications | | | |
|---|---|---|---|---|
| | HYFY | VIEWEDIT | WEBEX | LOOM |
| 15 seconds | 55 s | 33 s | 3 min 20 s | 1 s |
| 30 seconds | 1 min 5 s | 31 s | 3 min 42 s | 2 s |
| 1 minute | 1 min 19 s | 38 s | 4 min 15 s* | 1 s |
| 3 minutes | 3 in 4 s | 48 s | 5 min* | 1 s |
| 5 minutes | 5 min* | 45 s | 7 min* | 1 s |
| 15 minutes | 15 min* | 1 min* | 20 min* | 4 s |
| 30 minutes | 30 min* | 1 min 15 s* | 40 min* | 2 s |
| 60 minutes | 60 min* | 1 min 45 s* | 1 hr 20 min* | 1 s* |
| 90 minutes | 90 min* | 2 min in 15 s* | 2 hr* | 1 s* |

*projected

Figure 11A:
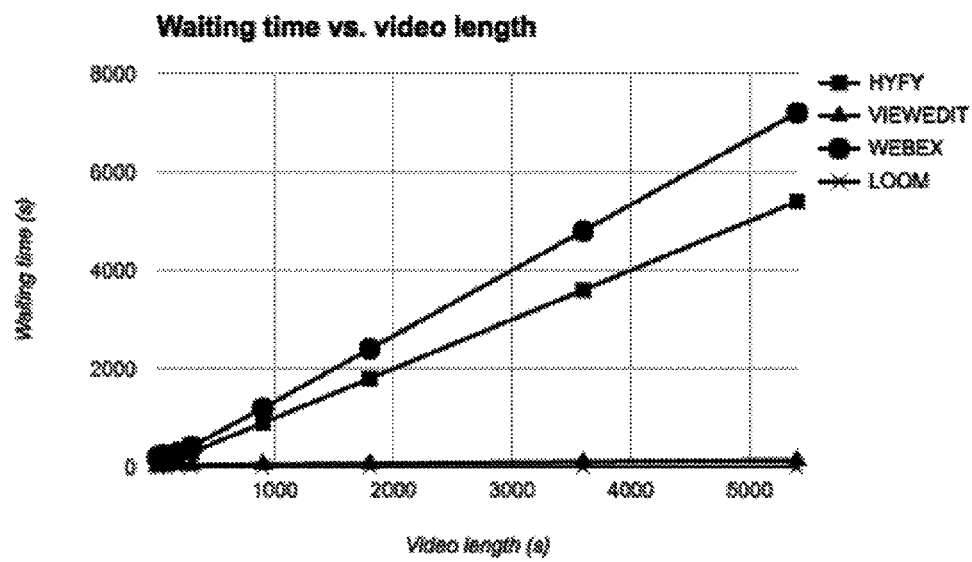
FIG. 11A is a chart comparing upload waiting times for applications HYFY, VIEWEDIT, WEBEX, and one embodiment of the present invention LOOM.
Figure 11B:
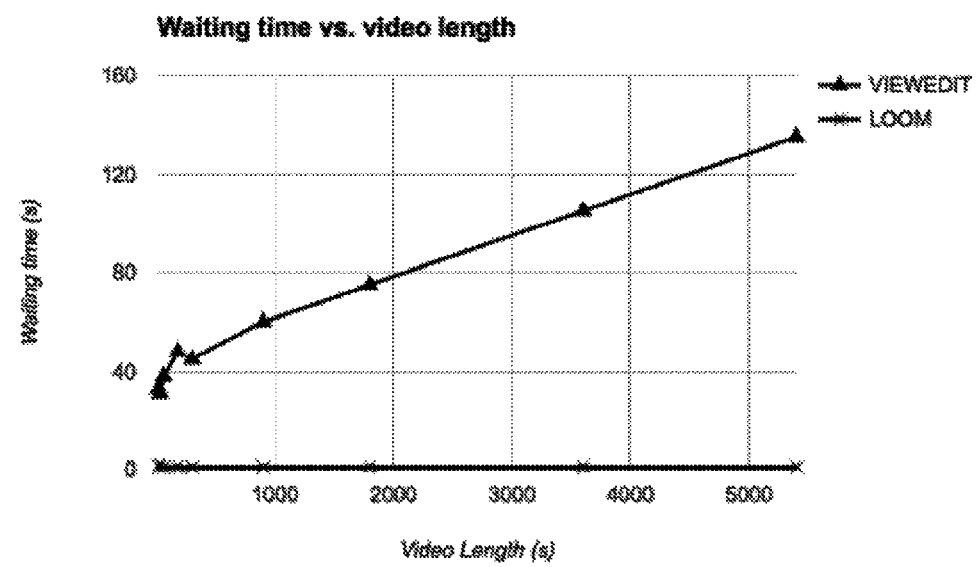
FIG. 11B is a chart comparing upload waiting times for applications VIEWEDIT and one embodiment of the present invention LOOM.

FIG. 11A and FIG. 11B illustrate these performances in terms of upload waiting time versus video length in chart 1100 and 1150 respectively. FIG. 11A shows the performance of all four applications investigated, and FIG. 11B shows a zoomed-in view comparing the performance of VIEWEDIT and LOOM only, for clarity. These results show that the present invention is much faster than other applications for video uploads, where the recording user needs only wait for a second or two after a recording is finished, until the video becomes available, as compared to waiting times that are at best on the order of minutes as video lengths become more than 15 minutes. The superior results of our present invention can be explained by the fact that data processing is continually being performed as the media stream is uploaded, and the waiting time is only the time to upload and process a remaining bytes at the end of the video, after the recording process terminates.

Illustrative Case Study: EXPERIMENT, Inc.

To demonstrate the effectiveness of methods and system as disclosed herein, a case study is presented next. This case study is not to be read as limiting the scope of the present invention, its applications, or uses.

EXPERIMENT, Inc. is a crowdfunding platform for scientific research. It is analogous to a Kickstarter for scientific research where most of the users are graduate students and professors working on early-stage research ideas. Before the use of LOOM, EXPERIMENT was constantly challenged with issues of inefficiency. With LOOM, platform debugging, new feature distribution, and customer service all had significant improvements in efficiency.

More specifically, before LOOM, programming bug reporting and tracking using text-based communication was a time-consuming and confusing process, especially for new users who are unfamiliar with the system and often have difficulties reproducing certain scenarios for discussion with in-house engineers. Similarly, dissemination of new product features proved to be problematic. With LOOM, logging bugs or sharing new features with users can be done very simply by hitting a record button to capture what is going on in the EXPERIMENT application and to explain the process of how to make progress in the platform. Bugs, new product features, and even new crowdfunding strategies may be recorded using screenshots accompanied by detailed notes, and made available to both users and engineers.

In addition, LOOM allowed new ways of instantaneous and asynchronous sharing of new ideas, suggestions, and advice for project fundraising. Users can shoot short or long videos which are uploaded while being recorded, and immediately made available to all other users within the platform. The negligible latency in the video sharing process enabled dynamic and innovative interactions among users, allowed the preservation of the full context of creative ideas as they are generated, and greatly improved user experiences of the EXPERIMENT platform.

By allowing the founder of EXPERIMENT to asynchronously yet instantaneously walk researchers through bugs or new features on the platform, LOOM enabled quick and accurate elimination of questions without noticeable communication delays, and in so doing, provided great time savings in such information exchanges. The availability of video communication data as soon as such data are recorded proved to be extremely beneficial in inciting user satisfaction while utilizing the EXPERIMENT platform.

Implementation of the Present Invention

Figure 9:
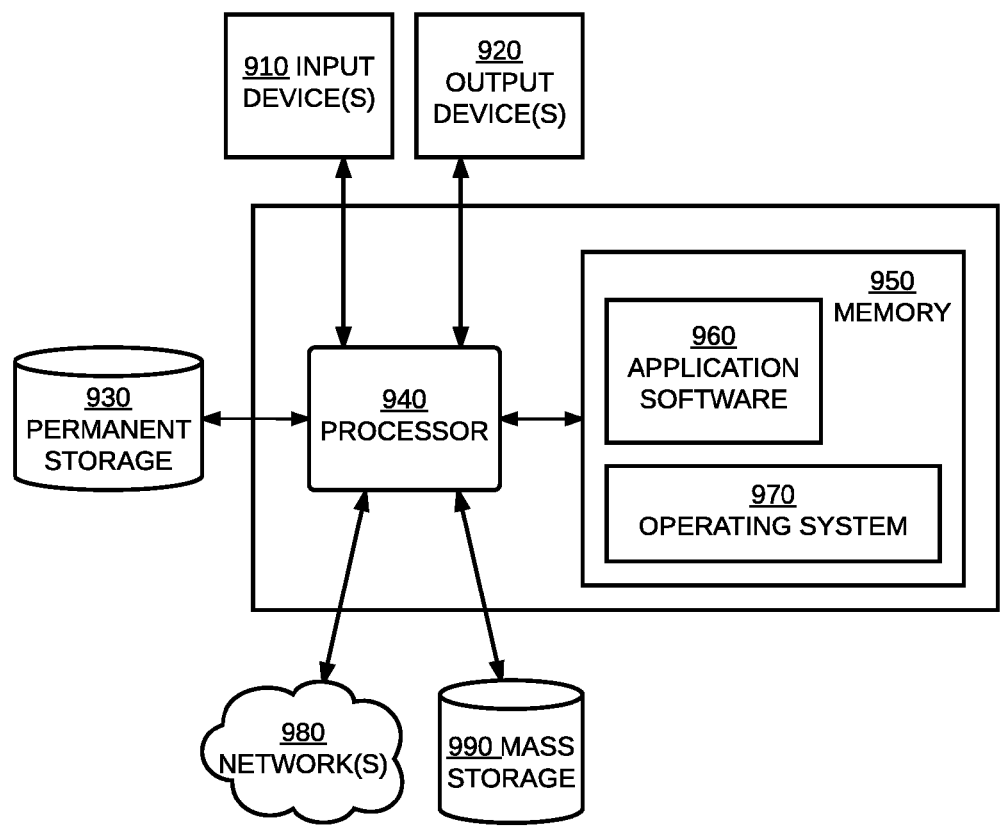
FIG. 9 is an illustrative architecture diagram of a server for implementing one embodiment of the present invention.

The present invention may be implemented using server-based hardware and software. FIG. 9 shows an illustrative architecture diagram 900 of a server for implementing one embodiment of the present invention, which is now described below.

The present invention may be implemented in hardware and/or in software. Many components of the system, for example, network interfaces etc., have not been shown, so as not to obscure the present invention. However, one of ordinary skill in the art would appreciate that the system necessarily includes these components. A user-device is a hardware that includes at least one processor 940 coupled to a memory 950. The processor may represent one or more processors, such as microprocessors, and the memory may represent random access memory (RAM) devices comprising a main storage of the hardware, as well as any supplemental levels of memory e.g., cache memories, non-volatile or back-up memories such as programmable or flash memories, read-only memories, etc. In addition, the memory may be considered to include memory storage physically located elsewhere in the hardware, e.g. any cache memory in the processor, as well as any storage capacity used as a virtual memory, e.g., as stored on a mass storage device.

The hardware of a user-device also typically receives a number of inputs 910 and outputs 920 for communicating information externally. For interface with a user, the hardware may include one or more user input devices, such as a keyboard, a mouse, a scanner, a microphone, a web camera, etc., and a display, for example, a Liquid Crystal Display (LCD) panel. For additional storage, the hardware my also include one or more mass storage devices 990, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware may include an interface with one or more units of external permanent storage 930, which are used for blob storage, searchable index storage, and any other permanent storage, and which are usually implemented with a hard disk and a SQL abstraction layer for example. The system, as recognized by one of ordinary skill in the art, would also possess buffers, transitory storage, and any other hardware and/or software components, with appropriate abstraction layers, to implement the present invention. In the case in which a blob storage is a just a buffer, there is some other permanent storage elsewhere, for example, in Amazon S3 cloud storage. The hardware may include an interface with one or more networks 980 (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces to communicate with each other.

The hardware operates under the control of an operating system 970, and executes various computer software applications 960, components, programs, codes, libraries, objects, modules, etc. indicated collectively by reference numerals to perform the methods, processes, and techniques described above.

Figure 10:
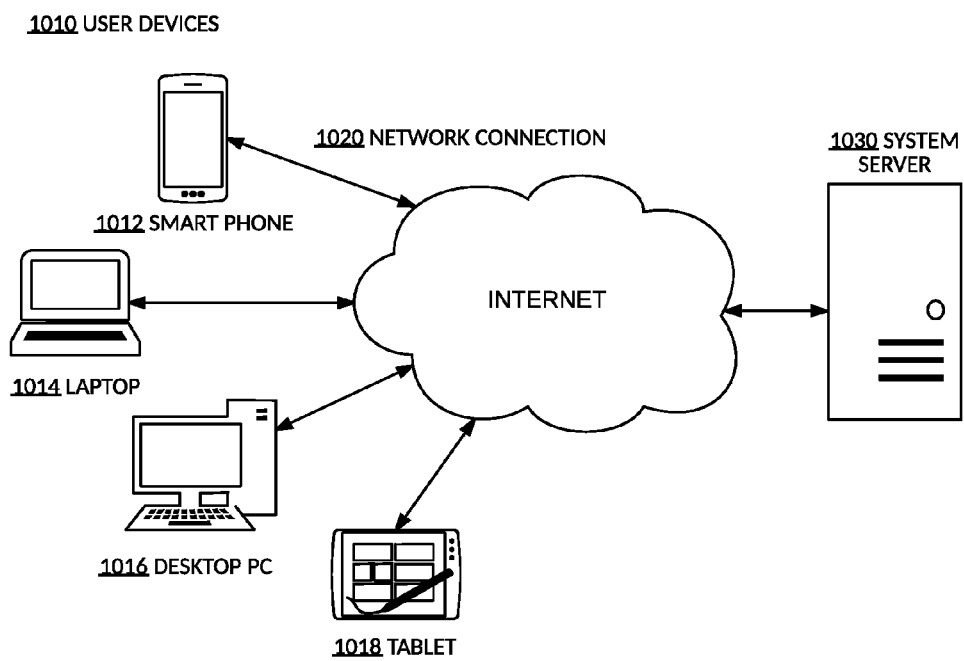
FIG. 10 is an illustrative client-server environment for implementation of one embodiment of the present invention.

The present invention may be implemented in a client server environment. FIG. 10 shows an illustrative system architecture 1000 for implementing one embodiment of the present invention in a client server environment. User devices 1010 on the client side may include smart phones 1012, laptops 1014, desktop PCs 1016, tablets 1018, or other devices. Such user devices 1010 access the service of the system server 1030 through some network connection 1020, such as the Internet.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

In general, the method executed to implement the embodiments of the invention, may be implemented as part of an operating system or a specific application, component, program, object, module or sequence of instructions referred to as "computer program(s)" or "computer code(s)." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks, which include Compact Disk Read-Only Memory (CD ROMS), Digital Versatile Disks (DVDs), etc., as well as digital and analog communication media.

CONCLUSIONS

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every user is accommodated to practice the methods of the present invention.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. A system for sharing media asynchronously, comprising: a server having access to at least one processor and a user device; and
    a non-transitory physical medium for storing program code and accessible by the server, the program code when executed by the processor causes the processor to:
    establish a communication channel between the user device and the server; receive by the server, through the communication channel from the user device, a
    media stream object containing a recording initiated on the user device, wherein the recording is uploaded from the user device as it is recorded on the user device, wherein the recording is not a live broadcast, and wherein the recording is received in smaller segmented chunks by the server at discrete intervals;
    generate a complete metadata atom of the recording in real-time as the media stream object is received by the server by updating the complete metadata atom as each smaller segmented chunk of the recording is received by the server at the discrete intervals;
    store the recording and the complete metadata atom to permanent storage as the recording is received;
    receive a publication request from the user device, wherein the publication request is received from the user device at a publication request time; and
    in response to receiving the publication request, make the recording accessible to one or more viewers within an immediate time frame by generating, from the recording, a complete video file containing the complete metadata atom ready for download by the one or more viewers, wherein the immediate time frame is a time to upload a remaining number of bytes to the server from the publication request time plus a time to complete processing the remaining number of bytes to generate the complete video file plus a time to update the complete metadata atom for the remaining number of bytes, and wherein the immediate time frame does not depend on a length of the complete video file.

2. The system of claim 1, wherein the program code when executed by the processor further causes the processor to:
    initiate a post-processing pipeline to post-process the received recording,
    wherein the complete video file is generated from a post-processed recording, and wherein the post-processing pipeline performs a transcoding function.

3. The system of claim 1, wherein a remaining amount of time is minimized to update the complete metadata atom on just the remaining number of bytes during the processing of the remaining number of bytes.

4. The system of claim 2, wherein the post-processing pipeline further performs a post-processing function selected from the group consisting of audio extraction, speech-to-text conversion, video processing indexing, object detection, phoneme search, eye tracking, sentiment analysis, behavioral analysis, and gesture analysis.

5. The system of claim 1, wherein the communication channel from the user device to the server utilizes a lossless protocol,
    wherein the media stream object is attached to a stream recorder on the user device,
    wherein the recording in the media stream object is segmented into a plurality of video segments, and
    wherein the receiving of the media stream object through the communication channel comprises receiving a subset of the plurality of video segments from the user device at discrete intervals.

6. The system of claim 5, wherein the program code when executed by the processor further causes the processor to:
    determine whether a transmission speed over the communication channel is below a predetermined threshold; and
    in response to determining that the transmission speed over the communication channel is below the predetermined threshold, down-sample the recorded data to reduce the rate of data transmitted through the communication channel.

7. The system of claim 5, wherein the program code when executed by the processor further causes the processor to:
    determine whether a transmission speed over the communication channel is below a predetermined threshold; and
    in response to determining that the transmission speed over the communication channel is below the predetermined threshold, replace the lossless protocol with a lossy protocol.

8. The system of claim 5, wherein the program code when executed by the processor further causes the processor to:
    determine whether a transmission speed over the communication channel is below a predetermined threshold and whether a post-processing pipeline has already been started; and
    in response to determining that the transmission speed over the communication channel is below the predetermined threshold and that a post-processing pipeline has already been started, continue the post-processing pipeline concurrently as the recorded data on the user device is stored in a buffer.

9. The system of claim 1, wherein the communication channel utilizes a lossy peer-to-peer real-time protocol,
    wherein the user device functions as a first peer in the communication channel, and
    wherein the server functions as a second peer in the communication channel.

10. The system of claim 9, wherein the program code when executed by the processor further causes the processor to:
    determine whether a direct connection between the user device and the server has failed; and
    in response to determining that the direct connection has failed, use a second server to relay traffic between the user device and the server, wherein the second server resides on the public internet, and wherein the second server is a TURN (Traversal Using Relays around Network address translators) server.

11. The system of claim 1, wherein the media stream object further contains a recording from a front-facing camera on the user device.

12. The system of claim 1, wherein the media stream object further contains a recording of a user annotation on the screen of the user device and a recording from a camera on the user device.

13. The system of claim 1, wherein the media stream object further contains a superposition of a recording from a front-facing camera on the user device, and a recording from a back-facing camera on the user device.

14. A method of sharing media asynchronously, comprising:
    establishing a communication channel between a user device and a server;
    receiving, through the communication channel from the user device, a media stream object containing a recording initiated on the user device, wherein the recording is received as it is recorded on the user device, and wherein the recording is of a screen of the user device;
    storing the recording to permanent storage as the recording is received;
    receiving a publication request from the user device, wherein the publication request is received from a user at a publication request time; and
    in response to receiving the publication request, making the recording accessible to one or more viewers within an immediate time frame by generating, from the recording, a complete video file ready for download by the one or more viewers, wherein the immediate time frame is a time to upload a remaining number of bytes to the server from the publication request time plus a time to complete processing the remaining number of bytes to generate the complete video file.

15. A method of sharing media synchronously, comprising: establishing a communication channel between a user device and a server;
    receiving by the server, through the communication channel from the user device, a media stream object containing a recording initiated on the user device, wherein the recording is received as it is recorded on the user device, wherein the recording is not a live broadcast, and wherein the recording is received in smaller segmented chunks by the server at discrete intervals;
    generating a complete metadata atom of the recording in real-time as the media stream object is received by the server by updating the complete metadata atom as each smaller segmented chunk of the recording is received by the server at the discrete intervals;
    storing the recording and the complete metadata atom to permanent storage as the recording is received;
    receiving a publication request from the user device, wherein the publication request is received from the user device at a publication request time; and
    in response to receiving the publication request, making the recording accessible to one or more viewers within an immediate time frame by generating, from the recording, a complete video file containing the complete metadata atom ready for download by the one or more viewers, wherein the immediate time frame is a time to upload a remaining number of bytes to the server from the publication request time plus a time to complete processing the remaining number of bytes to generate the complete video file plus a time to update the complete metadata atom for the remaining number of bytes, and wherein the immediate time frame does not depend on a length of the complete video file.

16. The method of claim 14, wherein a remaining amount of time is minimized to update the complete metadata atom on just the remaining number of bytes during the processing of the remaining number of bytes.

17. The method of claim 14, wherein the communication channel from the user device to the server utilizes a lossless protocol,
   wherein the media stream object is attached to a stream recorder on the user device,
   wherein the recording in the media stream object is segmented into a plurality of video segments, and
   wherein the receiving of the media stream object through the communication channel comprises receiving a subset of the plurality of video segments from the user device at discrete intervals.

18. The method of claim 17, further comprising:
   determining whether a transmission speed over the communication channel is below a predetermined threshold; and
   in response to determining that the transmission speed over the communication channel is below the predetermined threshold, perform a function selected from the group consisting of down-sampling the recorded data to reduce the rate of data transmitted through the communication channel and replacing the lossless protocol with a lossy protocol.

19. The method of claim 14, wherein the media stream object further contains an element selected from the group consisting of:
   a recording from a front-facing camera on the user device,
   a recording of a user annotation on the screen of the user device and a recording from a camera on the user device, and
   a superposition of a recording from a front-facing camera on the user device and a recording from a back-facing camera on the user device.

20. A non-transitory computer-readable storage medium for sharing media asynchronously, the storage medium comprising program code stored thereon, that when executed by a processor, causes the processor to:
   establish a communication channel between a user device and a server;
   receive by the server, through the communication channel from the user device, a media stream object containing a recording initiated on the user device, wherein the recording is received as it is recorded on the user device, wherein the recording is not a live broadcast, and wherein the recording is received in smaller segmented chunks by the server at discrete intervals;
   generate a complete metadata atom of the recording in real-time as the media stream object is received by the server by updating the complete metadata atom as each smaller segmented chunk of the recording is received by the server at the discrete intervals;
   store the recording and the complete metadata atom to permanent storage as the recording is received;
   initiate a post-processing pipeline to post-process the recording as the recording is received;
   receive a publication request from the user device, wherein the publication request is received from the user device at a publication request time; and
   in response to receiving the publication request, make the recording accessible to one or more viewers within an immediate time frame by generating, from a post-processed recording, a complete video file containing the complete metadata atom ready for download by the one or more viewers, wherein the immediate time frame is a time to upload a remaining number of bytes to the server from the publication request time plus a time to complete post-processing the remaining number of bytes to generate the complete video file plus a time to update the complete metadata atom for the remaining number of bytes, and wherein the immediate time frame does not depend on a length of the complete video file.

* * * * *